(12) United States Patent
Herzig et al.

(10) Patent No.: US 6,258,913 B1
(45) Date of Patent: Jul. 10, 2001

(54) POLYMERIC ORGANOSILICON COMPOUNDS, THEIR PRODUCTION AND USE

(75) Inventors: Christian Herzig, Waging am See; Robert Banfic, Burgkirchen; Reinhard Stallbauer, Zeilarn; Bernward Deubzer, Burghausen, all of (DE); David Heuttner, Tecumseh, MI (US)

(73) Assignee: Wacker-Chemie GmbH, München (DE)

( * ) Notice: Subject to any disclaimer, the term of this patent is extended or adjusted under 35 U.S.C. 154(b) by 0 days.

(21) Appl. No.: 09/341,485

(22) PCT Filed: Jan. 15, 1998

(86) PCT No.: PCT/EP98/00205

§ 371 Date: Aug. 13, 1999

§ 102(e) Date: Aug. 13, 1999

(87) PCT Pub. No.: WO98/31727

PCT Pub. Date: Jul. 23, 1998

(30) Foreign Application Priority Data

Jan. 16, 1997 (DE) ............................................. 197 01 393

(51) Int. Cl.[7] .................................................. C08G 77/08
(52) U.S. Cl. ................................ 528/15; 528/31; 528/32; 528/25; 428/447; 427/387; 427/434; 427/435; 427/430; 427/453; 427/462; 427/479
(58) Field of Search ................................. 528/31, 32, 15, 528/25; 556/434, 435, 453, 462, 479, 430; 427/387; 428/447

(56) References Cited

U.S. PATENT DOCUMENTS

| | | |
|---|---|---|
| 2,476,166 | 7/1949 | Wayo . |
| 3,269,983 * | 8/1966 | Holbrook ............................ 260/46.5 |
| 3,445,420 | 5/1969 | Kookootsedes et al. . |
| 3,775,452 | 11/1973 | Karstedt . |
| 4,043,977 | 8/1977 | deMontigny et al. . |
| 4,292,434 | 9/1981 | Lindner et al. . |
| 4,339,564 * | 7/1982 | Okamura ................................ 528/15 |
| 4,504,645 | 3/1985 | Melancon . |
| 5,086,147 * | 2/1992 | Ikeno et al. ............................ 528/15 |
| 5,241,034 | 8/1993 | Herzig et al. . |
| 5,504,175 | 4/1996 | Kobayashi . |
| 5,691,435 | 11/1997 | Herzig et al. . |
| 5,703,190 | 12/1997 | Dauth et al. . |

FOREIGN PATENT DOCUMENTS

| | | |
|---|---|---|
| 195 22 144 A1 | 1/1997 | (DE) . |
| 196 02 663 A1 | 7/1997 | (DE) . |
| 0 110 370 B1 | 4/1987 | (EP) . |
| 0 773 261 B1 | 1/1998 | (EP) . |
| 97 23 548 A1 | 7/1997 | (WO) . |

OTHER PUBLICATIONS

Derwent Abstract corr. to DE 19522144 (AN 1997–053209).
Journal of Inorganic and Organometallic Polymers, vol. 4, No. 1, (1994), pp. 61.

* cited by examiner

Primary Examiner—Margaret G. Moore
(74) Attorney, Agent, or Firm—Brooks & Kushman P.C.

(57) ABSTRACT

The invention relates to novel polymeric organosilicon compounds comprising hydrocarbon radicals with at least one aliphatic carbon-carbon double bond in a terminal position. To produce these compounds, (A) compounds containing at least one aliphatic carbon-carbon double bond per molecule, in a terminal position, are reacted with (B) oligomeric or polymeric organosilicon compounds containing units of the general formula $R^1R_2SiO_{1/2}$ and units of the general formula HRSiO and/or $HSiO_{3/2}$ and possibly units of the general formula $R_2SiO$, where R is a monovalent, possibly substituted, hydrocarbon radical with between 1 and 18 carbon atoms per radical, which is free of aliphatic carbon-carbon double bonds, and $R^1$ is a monovalent hydrocarbon radical with between 1 and 18 carbon atoms per radical which has at least one aliphatic carbon-carbon double bond in a terminal position, subject to the condition that the sum of the units HRSiO and $R^1R_2SiO_{1/2}$ on average is greater than 2.0 if (B) contains no $HSiO_{3/2}$ units, and the number of $R^1$ radicals per molecule is greater than the number of Si-bonded hydrogen atoms, in the presence of (C) catalysts promoting the addition of Si-bonded hydrogen to aliphatic double-bonds. The ratio of aliphatic double bonds in components (A) and (B) to Si-bonded hydrogen in component (B) is between 1.5 and 10, subject to the condition that the polymeric organosilicon compounds on average contain more than two hydrocarbon radicals with at least one aliphatic carbon-carbon double bond in a terminal position.

16 Claims, No Drawings

POLYMERIC ORGANOSILICON COMPOUNDS, THEIR PRODUCTION AND USE

The invention relates to polymeric organosilicon compounds which contain hydrocarbon radicals having terminal aliphatic carbon-carbon double bonds, to a process for their preparation, and to their use in crosslinkable compositions, in particular for preparing antiadhesive coatings.

Polyaddition reactions of organopolysiloxanes having at least three Si-bonded hydrogen atoms per molecule with α,ω-dialkenyldiorganopolysiloxanes lead, with a C=C/Si—H ratio of close to 1, to insoluble networks. If soluble alkenyl-containing organopolysiloxanes are to be prepared, a larger excess of the α,ω-dialkenyldiorganopolysiloxane is necessary, which after the end of the polyaddition cannot be removed and thus dilutes the polyaddition product.

U.S. Pat. No. 5,241,034 discloses alkenyl-containing siloxane copolymers which are prepared by reacting an organic compound (1) having two, three or four terminal aliphatic carbon-carbon double bonds with an organopolysiloxane (2) which contains Si-bonded hydrogen atoms in the presence of a hydrosilylation catalyst. In this reaction, polyaddition products are obtained in which organopolysiloxane blocks are connected by hydrocarbon bridges. In order to obtain unsaturated siloxane copolymers the ratio of C=C double bond in organic compound (1) to Si-bonded hydrogen in the organopolysiloxane (2) must always be greater than 1. The organopolysiloxane (2) containing Si-bonded hydrogen atoms does not contain any alkenyl radicals.

U.S. Pat. No. 5,504,175 describes a process for preparing linear α,ω-dialkenyldiorganopolysiloxanes in which a linear α-hydrido-ω-alkenyldiorganopolysiloxane is reacted with a linear α,ω-dialkenyldiorganosiloxane in the presence of a hydrosilylation catalyst. The linear α,ω-dialkenyldiorganopolysiloxanes prepared by the process can contain on average not more than two alkenyl groups.

In J. Inorg. Organomet. Polymer 4 (1), 61 (1994) a process is described for preparing highly branched vinylsiloxanes. A platinum catalyst is added to tris(dimethylvinylsiloxy)silane, and the system reacts in an uncontrollable polyaddition to give siloxanes with a high vinyl density. Tris(dimethylvinylsiloxy)silane contains three vinyl groups and one Si-bonded hydrogen atom per molecule. Compounds which contain alkenyl groups and are free from Si-bonded hydrogen are not employed in the process.

The object was to provide polymeric organosilicon compounds which are branched or star-shaped, which contain on average more than two hydrocarbon radicals having at least one terminal aliphatic carbon-carbon double bond, which contain only small amounts of linear α,ω-dialkenyldiorganopolysiloxanes, which can be prepared by a simple process, and which crosslink with organosilicon compounds containing Si-bonded hydrogen atoms in the presence of catalysts which promote the addition of Si-bonded hydrogen onto aliphatic multiple bond. The object was, furthermore, to provide crosslinkable compositions which are suitable for preparing coatings which repel tacky substances. The object is achieved by the invention.

The invention provides polymeric organosilicon compounds which contain hydrocarbon radicals having at least one terminal aliphatic carbon-carbon double bond, preparable by reacting (A) compounds which contain at least one terminal aliphatic carbon-carbon double bond per molecule with (B) oligomeric or polymeric organosilicon compounds which comprise units of the general formula $R^1R_2SiO_{1/2}$ and units of the general formula $HRSiO$ and/or $HSiO_{3/2}$ and, if desired, units of the general formula $R_2SiO$, where R is identical or different at each occurrence and is a monovalent, substituted or unsubstituted hydrocarbon radical having 1 to 18 carbon atoms per radical, which is free from aliphatic carbon-carbon double bonds, $R^1$ is identical or different at each occurrence and is a monovalent hydrocarbon radical having 1 to 18 carbon atoms per radical, which contains at least one terminal aliphatic carbon-carbon double bond, with the proviso that the sum of the units HRSiO and $R^1R_2SiO_{1/2}$ is on average greater than 2.0 if (B) contains no units $HSiO_{3/2}$, and the number of radicals $R^1$ is on average greater than the number of Si-bonded hydrogen atoms, in the presence of (C) catalysts which promote the addition of Si-bonded hydrogen onto aliphatic double bond, the ratio of aliphatic double bond in components (A) and (B) to Si-bonded hydrogen in component (B) that is employed being from 1.5 to 10, preferably from 1.5 to 5.0, more preferably from 1.5 to 4.0, with the proviso that the polymeric organosilicon compounds contain on average more than two hydrocarbon radicals having at least one terminal aliphatic carbon-carbon double bond.

The invention also provides a process for preparing polymeric organosilicon compounds which contain hydrocarbon radicals having at least one terminal aliphatic carbon-carbon double bond, which comprises reacting (A) compounds which contain at least one terminal aliphatic carbon-carbon double bond per molecule with (B) oligomeric or polymeric organosilicon compounds which comprise units of the general formula $R^1R_2SiO_{1/2}$ and units of the general formula $HRSiO$ and/or $HSiO_{3/2}$ and, if desired, units of the general formula $R_2SiO$, where R and $R^1$ are as defined above, with the proviso that the sum of the units HRSiO and $R^1R_2SiO_{1/2}$ is on average greater than 2.0 if (B) contains no units $HSiO_{3/2}$, and the number of radicals $R^1$ is on average greater than the number of Si-bonded hydrogen atoms, in the presence of (C) catalysts which promote the addition of Si-bonded hydrogen onto aliphatic double bond, the ratio of aliphatic double bond in components (A) and (B) to Si-bonded hydrogen in component (B) that is employed being from 1.5 to 10, preferably from 1.5 to 5.0, more preferably from 1.5 to 4.0, with the proviso that the resulting polymeric organosilicon compounds contain on average more than two hydrocarbon radicals having at least one terminal aliphatic carbon-carbon double bond.

The polymeric organosilicon compounds of the invention preferably have a viscosity of from 20 to 2,000,000 mPa.s at 25° C., preferably from 100 to 500,000 mPa.s at 25° C.

Preferably, the numerical content of hydrocarbon radicals having at least one terminal aliphatic carbon-carbon double bond in the polymeric organosilicon compounds of the invention is such that they contain on average from 2.5 to 50 terminal aliphatic carbon-carbon double bonds.

The polymeric organosilicon compounds of the invention preferably have iodine numbers of from 0.5 to 40, preferably from 1.0 to 20, the iodine number indicating the amount of iodine, in grams, consumed in the course of addition onto the double bond, per 100 grams of organopolysiloxane of the invention that is employed.

In the process of the invention it is preferred to employ as component (A) polymeric organosilicon compounds selected from the group of the general formula $$R^1{}_aR_{3-a}Si(R^1RSi)_n(R_2Si)_mSiR^1{}_aR_{3-a} \quad (I)$$

$$R^1{}_aR_{3-a}SiO(R^1RSiO)_n(R_2SiO)_mSiR^1{}_aR_{3-a} \quad (II)$$

and $$R^1{}_aR_{3-a}Si-R^2-(R^1RSi-R^2-)_n(R_2Si-R^2-)_mSiR^1{}_aR_{3-a} \quad (III),$$

preferably organopolysiloxanes of the general formula $$R^1{}_aR_{3-a}SiO(R^1RSiO)_n(R_2SiO)_mSiR^1{}_aR_{3-a} \quad (II)$$

where R and $R^1$ are as defined above, $R^2$ is a divalent hydrocarbon radical having 2 to 8 carbon atoms, a is identical or different at each occurrence and is 0 or 1, preferably 1, n is 0, 1, 2, 3 or 4, preferably 0, 1 or 2, and m is 0 or an integer from 1 to 1500, with the proviso that they contain at least one terminal radical $R^1$ per molecule.

The organosilicon compounds of the formula (I), (II) or (III) which are employed as component (A) can also comprise, to a minor extent, preferably less than 5 mol-%, T or Q units, and also bifunctional bridges or trifunctional organic branching sites.

The organopolysiloxanes of the formula (II) preferably have a viscosity of from 1 to 100,000 mm²/s at 25° C.

Processes for preparing the organopolysiloxanes of the formula (II) are known to the skilled worker.

Examples of the radical R are alkyl radicals, such as the methyl, ethyl, n-propyl, isopropyl, n-butyl, isobutyl, tert-butyl, n-pentyl, isopentyl, neopentyl and the tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl and the 2-ethylhexyl radical, nonyl radicals, such as the n-nonyl radical, decyl radicals, such as the n-decyl radical, dodecyl radicals, such as the n-dodecyl radical, tetradecyl radicals, such as the n-tetradecyl radical, hexadecyl radicals, such as the n-hexadecyl radical, and octadecyl radicals, such as the n-octadecyl radical, cycloalkyl radicals, such as cyclopentyl, cyclohexyl and 4-ethylcyclohexyl radical, cycloheptyl radicals, norbornyl radicals and methylcyclohexyl radicals, aryl radicals, such as the phenyl, biphenylyl, naphthyl and anthryl and phenanthryl radical; alkaryl radicals, such as o-, m-, p-tolyl radicals, xylyl radicals and ethylphenyl radicals; aralkyl radicals, such as the benzyl radical, and the α- and the β-phenylethyl radicals.

The radical R is preferably the methyl radical.

Examples of substituted radicals R are halogenated radicals and radicals interrupted by one or more ether oxygen atoms.

Examples of halogenated radicals R are haloalkyl radicals, such as the 3,3,3-trifluoro-n-propyl radical, the 2,2,2,2',2',2'-hexafluoroisopropyl radical, the heptafluoroisopropyl radical and haloaryl radicals, such as the o-, m- and p-chlorophenyl radical.

Examples of substituted radicals R are radicals interrupted by one or more ether oxygen atoms, such as the 2-methoxyethyl and the 2-ethoxyethyl radical.

Examples of radicals $R^1$ are the vinyl, allyl, 3-butenyl, 5-hexenyl, 7-octenyl, 9-decenyl and the 11-dodecenyl radical, preference being given to the vinyl and the 5-hexenyl radical and particular preference to the vinyl radical.

Examples of radicals $R^2$ are those of the formula $-CH_2CH_2-$, $-CH(CH_3)-$, $-(CH_2)_4-$, $-(CH_2)_5-$, $-(CH_2)_6-$, $-(CH_2)_8-$, $-(CH_2)_{10}-$, $-(CH_2)_{12}-$, preference being given to the radicals of the formula $-CH_2CH_2-$, $-CH(CH_3)-$, $-(CH_2)_6-$, $-(CH_2)_8-$ and particular preference to the radical of the formula $-CH_2CH_2-$.

In the process of the invention it is possible as component (A) to employ organic compounds of the general formula $$Y(CH=CH_2)_x \quad (IV)$$

where Y is a mono-, di-, tri- or tetravalent, preferably a divalent or trivalent, hydrocarbon radical having 1 to 28 carbon atoms, which can be interrupted by one or more oxygen, silicon, boron or titanium atoms or contains one or more $-CO_2$ groups, and x is 1, 2, 3 or 4, preferably 2 or 3.

Examples of x=1 are 1-pentene, 1-hexene, 1-octene, 1-dodecene, 1-tetradecene and 1-octadecene, and also ethylene glycol allyl methyl ether, allyl propyl ether, vinyl butyl ether and butyl 5-hexenyl ether, and also trimethylvinylsilane, tributylvinyltitanium, allyl acetate, dimethylvinylbutoxysilane, diethylvinylmethoxysilane and triethoxyvinylsilane.

Examples of x=2 are 1,5-hexadiene, 1,7-octadiene, diallyl ether, didodecenyl ether, divinyldimethylsilane, butyldiallylboron, vinyl undecenoate and diallyl adipate.

Examples of x=3 are 1,2,4-trivinylcyclohexane, 3,5-dimethyl-4-vinyl-1,6-heptadiene, pentaerythritol triallyl ether, methyltrivinylsilane, triallylboron and triallyl benzenetricarboxylate.

Examples of x=4 are tetravinylcyclobutane and tetravinylsilane.

Component (B) preferably comprises units of the general formula $HRSiO$, $R^1R_2SiO_{1/2}$ and, if desired, $R_2SiO$, where R and $R^1$ are as defined above. If component (B) comprises units of the formula $HSiO_{3/2}$, which is not preferred, branching is already present.

In the process of the invention it is preferred as component (B) to employ organopolysiloxanes of the general formula $$(R^1{}_bR_{3-b}SiO_{1/2})_{2+r}(R^1RSiO)_o(HRSiO)_p(R_2SiO)_q(HSiO_{3/2})r \quad (V)$$

where R and $R^1$ are as defined above, b is identical or different at each occurrence and is 0 or 1, especially 1 o is 0, 1, 2 or 3, especially 0 or 1, p is 1, 2 or 3, especially 1 or 2, q is 0 or an integer from 1 to 100, in particular from 10 to 80, and r is 0, 1 or 2, especially 0 or 1, with the proviso that the sum b+p is on average greater than 2.0, if r is 0, and the number of radicals $R^1$ is on average greater than the number of Si-bonded hydrogen atoms.

In the process of the invention it is particularly preferred as component (B) to employ organopolysiloxanes of the general formula $$R^1{}_bR_{3-b}SiO(R^1RSiO)_o(HRSiO)_p(R_2SiO)_qSiR^1{}_bR_{3-b} \quad (VI)$$

where R and $R^1$ are as defined above,
- b is identical or different at each occurrence and is 0 or 1, especially 1
- o is 0, 1, 2 or 3, especially 0 or 1,
- p is 1, 2 or 3, especially 1 or 2,
- q is 0 or an integer from 1 to 100, in particular from 10 to 80, with the proviso that the sum b+p is on average greater than 2.0, and the number of radicals $R^1$ is on average greater than the number of Si-bonded hydrogen atoms.

The organopolysiloxanes employed as component (B) preferably contain 1 to 4 radicals $R^1$, more preferably on average from 1.5 to 3.0 radicals $R^1$, and preferably on average from 0.8 to 1.5 Si-bonded hydrogen atoms.

Component (B) preferably contains on average at least 1.3, more preferably on average at least 1.5 times as many radicals $R^1$ as Si-bonded hydrogen atoms.

Component (B) preferably has a viscosity of from 5 to 150 mm²/s at 25° C.

Organopolysiloxanes of the formula (V) are prepared by equilibrating organopolysiloxanes having terminal units of the formula $R^1R_2SiO_{1/2}$ and, if desired, $R_3SiO_{1/2}$ with organopolysiloxanes having Si-bonded hydrogen atoms in HRSiO and/or $HSiO_{3/2}$ units, where R and $R^1$ are as defined above.

As catalysts (C) which promote the addition of Si-bonded hydrogen onto aliphatic double bond it is also possible in the process of the invention to employ the same catalysts which it has also been possible to employ to date to promote the addition of Si-bonded hydrogen onto aliphatic double bond. The catalysts (C) preferably comprise a metal from the group of the platinum metals, or a compound or a complex from the group of the platinum metals. Examples of such catalysts are metallic and finely divided platinum, which can be on carriers such as silica, alumina or active charcoal, compounds or complexes of platinum, such as platinum halides, for example $PtCl_4$, $H_2PtCl_6*6H_2O$, $Na_2PtCl_4*4H_2O$, platinum-olefin complexes, platinum-alcohol complexes, platinum-alcoholate complexes, platinum-ether complexes, platinum-aldehyde complexes, platinum-ketone complexes, including reaction products of $H_2PtCl_6*6H_2O$ and cyclohexanone, platinum-vinylsiloxane complexes, such as platinum-1,3-divinyl-1,1,3,3-tetramethyldisiloxane complexes with or without a content of detectable inorganically bonded halogen, bis(gamma-picoline)platinum dichloride, trimethylenedipyridineplatinum dichloride, dicyclopentadieneplatinum dichloride, dimethyl sulfoxide-ethyleneplatinum(II) dichloride, cyclooctadieneplatinum dichloride, norbornadieneplatinum dichloride, gamma-picolineplatinum dichloride, cyclopentadieneplatinum dichloride, and reaction products of platinum tetrachloride with olefin and primary amine or secondary amine or primary and secondary amine in accordance with U.S. Pat. No. 4,292,434, such as the reaction product of platinum tetrachloride dissolved in 1-octene with sec-butylamine, or ammonium-platinum complexes according to EP-B 110 370.

The catalyst (C) is preferably used in amounts of from 1 to 100 ppm by weight (parts by weight per million parts by weight), more preferably in amounts of from 4 to 20 ppm by weight, calculated in each case as elemental platinum and based on the overall weight of components (A) and (B).

The process of the invention is preferably conducted at the pressure of the surrounding atmosphere, i.e. at about 1020 hPa (abs.), but can also be conducted at higher or lower pressures. Furthermore, the process of the invention is preferably conducted at a temperature of from 50° C. to 150° C., more preferably from 60° C. to 120° C.

In the process of the invention it is also possible to use inert organic solvents, although the use of inert organic solvents is not preferred. Examples of inert organic solvents are toluene, xylene, octane isomers, butyl acetate, 1,2-dimethoxyethane, tetrahydrofuran and cyclohexane.

The inert organic solvents, if used, are subsequently removed by distillation. High-polymer products preferably remain in solution in the inert solvent.

A preferred variant of the preparation process is the metered addition of component (B) to a solution of the catalyst (C) in component (A) at a temperature of from 40 to 120° C., or, if solvents are used, in a temperature range below their boiling points.

A further preferred variant is the mixing of components (A) and (B), with or without the use of solvents, with subsequent addition of a catalyst (C), after which the homogeneous mixture is heated to reaction temperature.

The process of the invention can be carried out batchwise, semicontinuously or fully continuously.

The polymeric organosilicon compounds of the invention can be crosslinked with organopolysiloxanes containing Si-bonded hydrogen atoms in the presence of hydrosilylation catalysts. In addition, the polymeric organosilicon compounds of the invention can also be crosslinked with organic polymers containing mercapto groups.

The polymeric organosilicon compounds of the invention are preferably used in crosslinkable compositions comprising
(1) polymeric organosilicon compounds of the invention, or the polymeric organosilicon compounds prepared by the process of the invention,
(2) organosilicon compounds containing Si-bonded hydrogen atoms,
(3) catalysts which promote the addition of Si-bonded hydrogen onto aliphatic multiple bond
and, if desired,
(4) agents which retard the addition of Si-bonded hydrogen onto aliphatic multiple bond at room temperature.

The crosslinkable compositions comprising the polymeric organosilicon compounds of the invention are preferably used for preparing coatings which repel tacky substances, for example for producing release papers.

The self-adhesive materials joined to the release paper are prepared by the off-line method or the in-line method. In the off-line method, the silicone composition is applied to the paper and crosslinked and then, in a subsequent step, normally after the winding up of the release paper onto a roll and after storage of the roll, an adhesive film, which lies for example on a label face paper, is applied to the coated paper and the assembly is then pressed together. In the in-line method, the silicone composition is applied to the paper and crosslinked, the silicone coating is coated with the adhesive, the label face paper is then applied to the adhesive, and finally the assembly is pressed together.

In connection with the compositions of the invention it is possible to employ one kind of polymeric organosilicon compound (1) or different kinds of polymeric organosilicon compounds (1).

In the case of solvent-free compositions the polymeric organosilicon compounds (1) preferably contain from 2.5 to 6, with particular preference from 2.5 to 5 terminal aliphatic carbon-carbon double bonds.

In the case of solvent-containing compositions the polymeric organosilicon compounds (1) preferably contain from 5 to 50, with particular preference from 8 to 40 terminal aliphatic carbon-carbon double bonds.

As constituent (2) it is also possible with the compositions of the invention to use the same organosilicon compounds, containing Si-bonded hydrogen atoms, which it has been possible to employ in connection with all hitherto known compositions comprising organosilicon compounds containing aliphatically unsaturated hydrocarbon radicals, such as vinyl groups, organosilicon compounds containing Si-bonded hydrogen atoms, and catalysts which promote the addition of Si-bonded hydrogen onto aliphatic multiple bond.

As constituent (2) it is preferred to use organopolysiloxanes comprising units of the formula $$H_e R_f SiO_{\frac{4-(e+f)}{2}}$$

where R is as defined above, e is 0 or 1, f is 0, 1, 2 or 3, and the sum e+f is not greater than 3, more preferably those of the formula $$H_g R_{3-g} SiO(SiR_2O)_k(SiRHO)_l SiR_{3-g} H_g$$

where R is as defined above, g is 0 or 1, k is 0 or an integer from 1 to 100, and l is 0 or an integer from 1 to 100, or organosilicon compounds containing Si-bonded hydrogen atoms as are described in the German application with the file reference 196 02 663.6, to the Applicant, or mixtures of the abovementioned organopolysiloxanes and organosilicon compounds.

The organopolysiloxanes (2) preferably contain at least 3 Si-bonded hydrogen atoms.

Examples of organopolysiloxanes (2) are, in particular, copolymers of dimethylhydridosiloxane, methylhydridosiloxane, dimethylsiloxane and trimethylsiloxane units, copolymers of trimethylsiloxane, dimethylhydridosiloxane and methylhydridosiloxane units, copolymers of trimethylsiloxane, dimethylsiloxane and methylhydridosiloxane units, copolymers of methylhydridosiloxane and trimethylsiloxane units, copolymers of methylhydridosiloxane, diphenylsiloxane and trimethylsiloxane units, copolymers of methylhydridosiloxane, dimethylhydridosiloxane and diphenylsiloxane units, copolymers of methylhydridosiloxane, phenylmethylsiloxane, trimethylsiloxane and/or dimethylhydridosiloxane units, copolymers of methylhydridosiloxane, dimethylsiloxane, diphenylsiloxane, trimethylsiloxane and/or dimethylhydridosiloxane units, and also copolymers of dimethylhydridosiloxane, trimethylsiloxane, phenylhydridosiloxane, dimethylsiloxane and/or phenylmethylsiloxane units.

Processes for preparing organosilicon compounds (2), including those organopolysiloxanes (2) of the preferred type, are general knowledge.

Organosilicon compounds (2) are preferably employed in amounts of from 0.5 to 6, more preferably from 1 to 3 and, with particular preference, from 1.5 to 2.5 gram atoms of Si-bonded hydrogen per mole of radical $R^1$ in the polymeric organosilicon compounds (1).

As catalysts (3) which promote the addition of Si-bonded hydrogen onto aliphatic multiple bond, with the compositions of the invention as well it is possible to use the same catalysts which it has also been possible to employ to promote crosslinking in the case of the compositions known to date for crosslinking organosilicon compounds containing aliphatic multiple bonds with compounds which contain Si-bonded hydrogen. As constituent (3) it is preferred to use the abovementioned catalysts (C).

Catalyst (3) is preferably employed in amounts of from 5 to 500 ppm by weight (parts by weight per million parts by weight), in particular from 10 to 200 ppm by weight, calculated in each case as elemental platinum metal and based on the overall weight of the organopolysiloxanes (1) and (2).

As agents which retard the addition of Si-bonded hydrogen onto aliphatic multiple bond at room temperature, so-called inhibitors (4), it is also possible with the compositions of the invention to use, if desired, all inhibitors which it has been possible to use to date for the same purpose. Examples of inhibitors are 1,3-divinyl-1,1,3,3-tetramethyldisiloxane, benzotriazole, dialkylformamide, alkylthioureas, methyl ethyl ketoxime, organic or organosilicon compounds having a boiling point of at least 25° C. at 1012 mbar (abs.) and at least one aliphatic triple bond, in accordance with U.S. Pat. No. 3,445,420, such as 1-ethynylcyclohexan-1-ol, 2-methyl-3-butyn-2-ol, 3-methyl-1-pentyn-3-ol, 2,5-dimethyl-3-hexyn-2,5-diol and 3,5-dimethyl-1-hexyn-3-ol, 3,7-dimethyloct-1-yn-6-en-3-ol, inhibitors according to U.S. Pat. No. 2,476,166, such as a mixture of diallyl maleate and vinyl acetate, and inhibitors according to U.S. Pat. No. 4,504,645, such as maleic monoesters.

The inhibitor (4) is preferably employed in amounts of from 0.001 to 10% by weight, based on the overall weight of the organopolysiloxanes (1) and (2).

Examples of further constituents which can also be used in the compositions of the invention are agents for adjusting the release force, solvents, adhesion promoters and pigments.

Examples of agents for adjusting the release force of the coatings prepared with the compositions of the invention, which coatings repel tacky substances, are silicone resins comprising units of the formula $$R^3(CH_3)_2SiO_{1/2} \text{ and } SiO_2,$$

so-called MQ resins, where $R^3$ is a hydrogen atom, a methyl radical or $R^1$ and the units of the formula $R^3(CH_3)_2SiO_{1/2}$ can be identical or different. The ratio of units of the formula $R^3(CH_3)_2SiO_{1/2}$ to units of the formula $SiO_2$ is preferably from 0.6 to 2. The silicone resins are preferably employed in amounts of from 5 to 80% by weight, based on the overall weight of the organopolysiloxanes (1) and (2).

The solvents which may be used in connection with the compositions of the invention can be the same solvents which it has been possible to use in the compositions known to date comprising organopolysiloxanes containing aliphatically unsaturated hydrocarbon radicals, organopolysiloxanes containing Si-bonded hydrogen, and catalysts which promote the addition of Si-bonded hydrogen onto aliphatic double bonds. Examples of such solvents are benzines, for example alkane mixtures having a boiling range of 80° C. to 110° C. at 1012 mbar (abs.), n-heptane, benzene, toluene and xylenes, halogenated alkanes having 1 to 6 carbon atoms, such as methylene chloride, trichloroethylene and perchloroethylene, ethers, such as di-n-butyl ether, esters, such as ethyl acetate, and ketones, such as methyl ethyl ketone and cyclohexanone.

If organic solvents are used they are judiciously employed in amounts of from 10 to 95% by weight, based on the weight of the polymeric organosilicone compounds (1).

The sequence when mixing the constituents (1) (2), (3) and, if used, (4) is not in fact critical; for practical purposes it has been found appropriate, however, to add the constituent (3), i.e. the catalyst, last to the mixture of the other constituents.

The crosslinking of the compositions of the invention takes place preferably at from 50° C. to 150° C. An advantage with the compositions of the invention is that rapid crosslinking is achieved even at low temperatures. Energy sources used for crosslinking by heating are preferably ovens, for example convection drying ovens, heating passages, heated rollers, heated plates or heat rays from the infra-red range.

Apart from by heating the compositions of the invention can also be crosslinked by irradiation with ultraviolet light or by irradiation with UV and IR light. The ultraviolet light used is customarily that with a wavelength of 253.7 nm. In commerce there are a large number of lamps which emit ultraviolet light with a wavelength of from 200 to 400 nm, and which preferentially emit ultraviolet light with a wavelength of 253.7 nm.

The application of the compositions of the invention to the surfaces to be made repellent to tacky substances can be accomplished in any desired manner which is suitable and widely known for the preparation of coatings from liquid substances, for example by dipping, brushing, pouring, spraying, rolling, printing, for example by means of an offset gravure coating device, by knife coating, or by means of an airbrush.

The surfaces to be made repellent to tacky substances and which can be treated in the context of the invention can comprise surfaces of any desired materials which are solid at room temperature and 1012 mbar (abs.). Examples of such surfaces are those of paper, wood, cork and polymer films, for example polyethylene films or polypropylene films, woven and nonwoven fabric of natural or synthetic fibers or glass fibers, ceramic articles, glass, metals, polyethylene-coated paper, and boards, including that of asbestos. The abovementioned polyethylene can in each case comprise high-pressure, medium-pressure or low-pressure polyethylene. The paper can comprise low-grade paper types, such as absorbent papers, including kraft paper which is raw, i.e. has not been pretreated with chemicals and/or polymeric natural substances, having a weight of from 60 to 150 g/m$^2$, unsized papers, papers of low freeness value, mechanical papers, unglazed or uncalendered papers, papers which are smooth on one side owing to the use of a dry glazing cylinder during their production, without additional complex measures, and are therefore referred to as "machine-glazed papers", uncoated papers or papers produced from waste paper, i.e. so-called recycled papers. The paper to be treated in accordance with the invention can also, however, of course comprise high-grade papers, such as low-absorbency papers, sized papers, papers of high freeness value, chemical papers, calendered or glazed papers, glassine papers, parchmentized papers or precoated papers. The boards may also be of low or high grade.

The compositions of the invention are suitable, for example, for the production of release, backing and interleaving papers, including interleaving papers which are employed in the production of, for example, cast films or decorative films, or of foams, including those of polyurethane. The compositions of the invention are also suitable, for example, for the production of release, backing and interleaving cards, films and cloths, for treating the reverse sides of self-adhesive tapes or self-adhesive films or the written faces of self-adhesive labels. The compositions of the invention are additionally suitable for treating packaging material, such as that comprising paper, cardboard boxes, metal foils and drums, for example, cardboard, plastic, wood or iron, which is or are intended for the storage and/or transportation of tacky goods, such as adhesives, sticky foodstuffs, for example cakes, honey, candies and meat, bitumen, asphalt, greased materials and crude rubber. A further example of the use of the compositions of the invention is the treatment of supports for the transfer of pressure-sensitive adhesive layers in the so-called transfer process.

The compositions of the invention are also suitable for the production of the self-adhesive materials joined to the release paper, both by the off-line method and by the in-line method.

Preparing Component (B)

a) Component B-1

1167 g of an equilibrate comprising dimethylsiloxy and vinyldimethylsiloxy units, with an iodine number of 22, together with 32.5 g of a hydrolysate of hydridomethyldichlorosilane which is terminated with trimethylsiloxy units and has a chain length of about 40 Si units, are equilibrated at 145° C. with 100 ppm of PNCl$_2$. The catalyst is deactivated by MgO and volatile constituents are removed at 140° C. and 3 hPa. This gives a polysiloxane having on average 1.9 vinyldimethylsiloxy and 1.1 hydridomethylsiloxy units per molecule and a viscosity of 32 mm$^2$/s at 25° C.

b) Component B-2

The following siloxanes are equilibrated at 145° C. with 75 ppm of PNCl$_2$:

1400 g of a trimethylsiloxy-terminated dimethylpolysiloxane having a viscosity of 10,000 mm$^2$/s at 25° C.,
100 g of divinyltetramethyldisiloxane, and
80 g of a trimethylsiloxy-terminated equilibrate comprising equimolar amounts of dimethylsiloxy and hydridomethylsiloxy units, having a viscosity of 70 mm$^2$/s at 25° C.

The product is worked up in accordance with the preparation of component B-1. This gives a polymer with Si-bonded vinyl groups and Si-bonded hydrogen atoms, which contains on average 1.8 vinyldimethylsiloxy and 1.0 hydridomethylsiloxy groups per molecule and has a viscosity of 72 mm$^2$/s at 25° C.

c) Component B-3

The following siloxanes are equilibrated at 145° C. with 75 ppm of PNCl$_2$:

360 g of a trimethylsiloxy-terminated dimethylpolysiloxane having a viscosity of 5000 mm$^2$/s at 25° C., 1240 g of a vinyl-terminated dimethylpolysiloxane with an iodine number of 22 and
80 g of a trimethylsiloxy-terminated equilibrate comprising equimolar amounts of dimethylsiloxy and hydridomethylsiloxy units, with a viscosity of 70 mm$^2$/s at 25° C.

Working up gives a polymer with Si-bonded vinyl groups and Si-bonded hydrogen atoms, which contains on average 1.9 vinyldimethylsiloxy and 1.0 hydridomethylsiloxy groups per molecule and has a viscosity of 47 mm$^2$/s at 25° C.

d) Component B-4

The preparation procedure for component B-3 is repeated but with the change that now, instead of 360 g of the siloxane with a viscosity of 5000 mm$^2$/s at 25° C., 1500 g of a siloxane with a viscosity of 10,000 mm$^2$/s at 25° C. are employed.

The product, when freed from volatile constituents, has a viscosity of 108 mm²/s at 25° C. and contains on average 1.8 vinyldimethylsiloxy and 1.0 hydridomethylsiloxy groups per molecule.

EXAMPLE 1

A solution of 252 g of an α,ω-divinyldimethylpolysiloxane having about 160 siloxy units per chain in 380 ml of cyclohexane is activated with 10 mg of platinum in the form of a platinum-1,3-divinyl-1,1,3,3-tetramethyldisiloxane complex, the so-called Karstedt catalyst, corresponding in the text below to the catalyst as prepared in accordance with U.S. Pat. No. 3,775,452, and is heated to 86° C. until gentle boiling at reflux ensues. Over a period of 2.5 hours a total of 322 g of component B-1, whose preparation is described above, are metered in at a uniform rate.

The clear, homogeneous product solution is freed gives 551 g of a clear, highly viscous oil of 11,300 mPa.s at 25° C. and an iodine number of 7. The polymer contains, per kg, 275 mmol of vinyl groups in the form of dimethylvinylsiloxy units; Si-bonded hydrogen can no longer be detected. The polymer has an average molecular weight, determined by means of gel permeation chromatography, of 33,000 and contains on average 9 $CH_2=CH(CH_3)_2SiO_{1/2}$ units per molecule.

EXAMPLE 2

106 g of an equilibrate comprising dimethylsiloxy and vinyldimethylsiloxy units, with an iodine number of 22, are catalyzed with 3 mg of platinum in the form of a Karstedt catalyst and heated to 120° C. Over the course of 2.5 hours 200 g of component B-1, whose preparation is described above, are metered in at a uniform rate and the reaction mixture is freed from volatile constituents in vacuo at up to 140° C. This gives a polyaddition product having a viscosity of 320 mm²/s at 25° C. and an iodine number of 13, corresponding to a vinyl content of 510 mmol of vinyl groups per kg. It contains no detectable Si-bonded hydrogen. The polymer has an average molecular weight, determined by means of gel permeation chromatography, of 8000 and contains on average 4 $CH_2=CH(CH_3)_2SiO_{1/2}$ units per molecule.

EXAMPLE 3

Example 2 is repeated adding only half the amount of component B-1. Analogous working up gives a polymer having a viscosity of 79 mm²/s at 25° C. and an iodine number of 15. The polymer has an average molecular weight, determined by means of gel permeation chromatography, of 4200 and contains on average 2.5 $CH_2=CH(CH_3)_2SiO_{1/2}$ units per molecule.

Comparison Experiment 1

Component B-1 is activated, without the addition of a component A, at 23° C. with Karstedt catalyst so that the platinum concentration is 10 ppm. The stirred solution slowly heats to 31° C. and becomes progressively more viscous. After a few minutes the silicone oil has gelled and is no longer flowable. The solid polyaddition product is insoluble and is no longer suitable for preparing heat-crosslinking compositions.

Comparison Experiment 2

Component B-2, whose preparation is described above, is activated with Karstedt catalyst as described in Comparison Experiment 1. The viscosity rises steadily until, again, an insoluble gel is obtained.

EXAMPLE 4

75 g of an α,ω-divinyldimethylpolysiloxane having a viscosity of 100,000 mPa.s at 25° C. (contains 2.0 meq. of vinyl) are diluted in 175 g of toluene, and, as in Example 2, the same amount of the platinum catalyst is added. At 102° C. over the course of about 2 hours a total of 250 g of a 30% strength solution of component B-3, whose preparation is described above, are metered in at constant rate, the overall amount of Si-bonded hydrogen being 25 meq., i.e. on average 25 molecules of B-3 are added onto one molecule A as initially charged. After a further half an hour at 102° C. the mixture is cooled. The polymer solution has a viscosity of 240 mm²/s at 25° C. and contains 49 mmol of vinyl groups per kg. The polymer has an average molecular weight, determined by means of gel permeation chromatography, of 120,000 and contains on average 20 $CH_2=CH(CH_3)_2SiO_{1/2}$ units per molecule.

EXAMPLE 5

Half of the polymer solution of the product from Example 4 (250 g) is again heated to 102° C. and component B-3 as a 30% strength solution (215 g) is again metered in over the course of 2 hours, so that the overall amount of the additionally added Si-bonded hydrogen is 21.5 meq. Identical subsequent reaction gives, ultimately, a polymer solution having a viscosity of 914 mm²/s at 25° C. and a content of 68 mmol of vinyl groups per kg. Overall, therefore, on average 68 molecules of B-3 had been added onto the molecule as initially charged in Example 4. The polymer solution exhibits uniform flow behavior and no gel fractions whatsoever. It can be diluted as desired with hydrocarbons to give homogeneous solutions. The polymer has an average molecular weight, determined by means of gel permeation chromatography, of 200,000 and contains on average 47 $CH_2=CH(CH_3)_2SiO_{1/2}$ units per molecule.

EXAMPLE 6

264 g of the component B-4 whose preparation was described above are mixed homogeneously with 9.3 g of 1,3-divinyltetramethyldisiloxane, after which 1.5 mg of Pt in the form of the Karstedt catalyst are added. The reaction mixture is heated at 120° C. for about one hour. This gives a branched graft polymer having a viscosity of 280 mm²/s at 25° C. and an iodine number of 13.5. The polymer has an average molecular weight, determined by means of gel permeation chromatography, of 7400 and contains on average 4 $CH_2=CH(CH_3)_2SiO_{1/2}$ units per molecule.

Comparison Experiment 3

Example 6 is repeated without mixing in the 1,3-divinyltetramethyldisiloxane. The mixture becomes very viscous when heated and then turns into an insoluble gel.

Comparison Experiment 4

Instead of the component B-1 in Example 1 use is made of a vinyl-free but otherwise identical version, i.e. a siloxane which contains only trimethylsiloxy end groups, and which is not in accordance with the invention. Working up gives a polymer having a viscosity of 730 mm²/s at 25° C., which according to the ¹H-NMR spectrum no longer has any vinyl groups.

EXAMPLE 7

The following constituents of a formulation for preparing release coatings are mixed in succession:

21.9 g of polymer from Example 6

55 mg of 1-ethynylcyclohexanol 1.4 g of crosslinker*

220 mg of Pt catalyst** (=2.2 mg of platinum)

* Equilibrate comprising hydridomethylsiloxy and trimethylsiloxy units, having a viscosity of 18 mm²/s at 25° C.

** Solution of a platinum-1,3-divinyl-1,1,3,3-tetramethyldisiloxane complex in linear α,ω-divinyldimethylpolysiloxane, having a platinum content of 1%.

The mixture has a gel time of about 70 hours at 25° C. A coating with a thickness of about 4 µm is applied to supercalendered paper using a glass rod and is cured at 90° C. in a convection oven.

|  | Stroke test | Substrate adhesion |
| --- | --- | --- |
| 3 seconds' curing time | 1–2 | 1–2 |
| 5 seconds' curing time | 1 | 1 |

1=best rating, 6=worst rating

After 5 seconds at 90° C. a coating absolutely free from stroke marks and with excellent substrate adhesion was obtained. Isothermal curing under static conditions was measured by means of DSC (Differential Scanning Calorimetry) at 80° C.: exothermic peak after 6.3 minutes with a total of 44 J/g heat output.

What is claimed is:

1. A polymeric organosilicon compound which contains hydrocarbon radicals having at least one terminal aliphatic carbon-carbon double bond, comprising the reaction product of (A) terminally unsaturated compounds selected from the group consisting of (A1) one or more polymeric organosilicon first reactant(s) selected from the group consisting of $R^1_aR_{3-a}Si(R^1RSi)_n(R_2Si)_mSiR^1_aR_{3-a}$     (I),

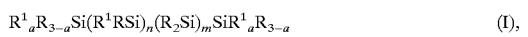

$R^1_aR_{3-a}SiO(R^1RSiO)_n(R_2SiO)_mSiR^1_aR_{3-a}$     (II),

and $R^1_aR_{3-a}Si-R^2-(R^1RSi-R^2-)_n(R_2Si-R^2-)_mSiR^1_aR_{3-a}$     (III),

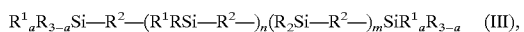

where R and $R^1$ are as defined below, $R^2$ is a divalent hydrocarbon radical having 2 to 8 carbon atoms, a is identical or different at each occurrence and is 0 or 1, n is 0, 1, 2, 3 or 4, and m is 0 or an integer from 1 to 1500, with the proviso that said polymeric organosilicon first reactant(s) contain at least one terminal radical $R^1$ per molecule, (A2) one or more organic compounds of the formula $Y(CH=CH_2)_x$     (IV)

where Y is a mono-, di-, tri- or tetravalent hydrocarbon radical having 1 to 28 carbon atoms, which can be interrupted by one or more oxygen, silicon, boron or titanium atoms or contains one or more $-CO_2-$ groups, where x is 1, 2, 3 or 4, and mixtures of (A1) and (A2) with (B) oligomeric or polymeric organosilicon second reactant(s) which comprise (B1) units of the general formula $R^1R_2SiO_{1/2}$, (B2) at least one unit selected from the group consisting of the general formulae HRSiO and $HSiO_{3/2}$, and (B3) optionally one or more units of the general formula $R_2SiO$, where R is identical or different at each occurrence and is a monovalent, substituted or unsubstituted hydrocarbon radical having 1 to 18 carbon atoms per radical, which is free from aliphatic carbon-carbon double bonds, $R^1$ is identical or different at each occurrence and is a monovalent hydrocarbon radical having 2 to 18 carbon atoms per radical, which contains at least one terminal aliphatic carbon-carbon double bond, with the proviso that the sum of the units HRSiO and $R^1R_2SiO_{1/2}$ is on average greater than 2.0 if (B) contains no units $HSiO_{3/2}$, and the number of radicals $R^1$ in said second reactant(s) is on average greater than the number of Si-bonded hydrogen atoms in said second reactant(s), in the presence of (C) catalysts which promote the addition of Si-bonded hydrogen onto an aliphatic double bond, the ratio of aliphatic double bonds in components (A) and (B) to Si-bonded hydrogens in component (B) being from 1.5 to 10, with the proviso that the polymeric organosilicon compound contain on average more than two hydrocarbon radicals having at least one terminal aliphatic carbon-carbon double bond.

2. A polymeric organosilicon compound as claimed in claim 1, wherein as component (A) organopolysiloxanes of the general formula $R^1_aR_{3-a}SiO(R^1RSiO)_n(R_2SiO)_mSiR^1_aR_{3-a}$     (II)

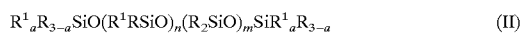

where a is 1 and n is 0, 1 or 2, are employed.

3. A polymeric organosilicon compound as claimed in claim 1, wherein as component (A) organic compounds (A2) are employed.

4. A polymeric organosilicon compound as claimed in claim 1, wherein as component (B) organopolysiloxanes of the general formula $R^1_bR_{3-b}SiO(R^1RSiO)_o(HRSiO)_p(R_2SiO)_qSiR^1_bR_{3-b}$     (VI)

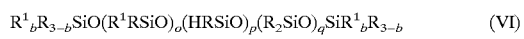

are employed, where b is identical or different at each occurrence and is 0 or 1, o is 0, 1, 2 or 3, p is 1, 2 or 3, and q is 0 or an integer from 1 to 100, with the proviso that the sum b+p is on average greater than 2.0, and the number of radicals $R^1$ is on average greater than the number of Si-bonded hydrogen atoms.

5. A polymeric organosilicon compound as claimed in claim 4, wherein b is 1, o is 0 or 1 and p is 1 or 2, with the proviso that the sum b+p is on average greater than 2.0 and the number of radicals $R^1$ is on average greater than the number of Si-bonded hydrogen atoms.

6. A process for preparing a polymeric organosilicon compound as claimed in claim 1, which comprises reacting (A) terminally unsaturated compounds selected from the group consisting of (A1) one or more polymeric organosilicon first reactant(s) selected from the group consisting of $R^1_aR_{3-a}Si(R^1RSi)_n(R_2Si)_mSiR^1_aR_{3-a}$     (I),

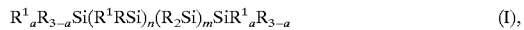

$R^1_aR_{3-a}SiO(R^1RSiO)_n(R_2SiO)_mSiR^1_aR_{3-a}$     (II),

and

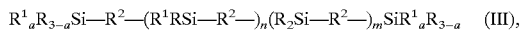

where R and R¹ are as defined below,
R² is a divalent hydrocarbon radical having 2 to 8 carbon atoms,
a is identical or different at each occurrence and is 0 or 1,
n is 0, 1, 2, 3 or 4, and
m is 0 or an integer from 1 to 1500,
with the proviso that said polymeric organosilicon first reactant(s) contain at least one terminal radical R¹ per molecule,
(A2) one or more organic compounds of the formula

where Y is a mono-, di-, tri- or tetravalent hydrocarbon radical having 1 to 28 carbon atoms, which can be interrupted by one or more oxygen, silicon, boron or titanium atoms or contains one or more —$CO_2$— groups, where x is 1, 2, 3 or 4, and mixtures of (A1) and (A2) with (B) oligomeric or polymeric organosilicon second reactant(s) which comprise
(B1) units of the general formula $R^1R_2SiO_{1/2}$,
(B2) at least one unit selected from the group consisting of the general formulae $HRSiO$ and $HSiO_{3/2}$, and
(B3) optionally one or more units of the general formula $R_2SiO$, where R is identical or different at each occurrence and is a monovalent, substituted or unsubstituted hydrocarbon radical having 1 to 18 carbon atoms per radical, which is free from aliphatic carbon-carbon double bonds,
R¹ is identical or different at each occurrence and is a monovalent hydrocarbon radical having 2 to 18 carbon atoms per radical, which contains at least one terminal aliphatic carbon-carbon double bond,
with the proviso that the sum of the units $HRSiO$ and $R^1R_2SiO_{1/2}$ is on average greater than 2.0 if (B) contains no units $HSiO_{3/2}$, and the number of radicals R¹ in said second reactant(s) is on average greater than the number of Si-bonded hydrogen atoms in said second reactant(s), in the presence of
(C) catalysts which promote the addition of Si-bonded hydrogen onto an aliphatic double bond,
the ratio of aliphatic double bonds in components (A) and (B) to Si-bonded hydrogens in component (B) being from 1.5 to 10,
with the proviso that the polymeric organosilicon compound contain on average more than two hydrocarbon radicals having at least one terminal aliphatic carbon-carbon double bond.

7. A crosslinkable composition comprising
(1) a polymeric organosilicon compound as claimed in claim 1,
(2) organosilicon compounds containing Si-bonded hydrogen atoms,
(3) catalysts which promote the addition of Si-bonded hydrogen onto aliphatic multiple bond
and optionally,
(4) agents which retard the addition of Si-bonded hydrogen onto aliphatic multiple bond at room temperature.

8. A crosslinkable composition comprising
(1) a polymeric organosilicon compound as claimed in claim 2,
(2) organosilicon compounds containing Si-bonded hydrogen atoms,
(3) catalysts which promote the addition of Si-bonded hydrogen onto aliphatic multiple bond
and optionally,
(4) agents which retard the addition of Si-bonded hydrogen onto aliphatic multiple bond at room temperature.

9. A crosslinkable composition comprising
(1) a polymeric organosilicon compound as claimed in claim 3,
(2) organosilicon compounds containing Si-bonded hydrogen atoms,
(3) catalysts which promote the addition of Si-bonded hydrogen onto aliphatic multiple bond
and optionally,
(4) agents which retard the addition of Si-bonded hydrogen onto aliphatic multiple bond at room temperature.

10. A crosslinkable composition comprising
(1) a polymeric organosilicon compound as claimed in claim 4,
(2) organosilicon compounds containing Si-bonded hydrogen atoms,
(3) catalysts which promote the addition of Si-bonded hydrogen onto aliphatic multiple bond
and optionally,
(4) agents which retard the addition of Si-bonded hydrogen onto aliphatic multiple bond at room temperature.

11. A crosslinkable composition comprising
(1) a polymeric organosilicon compound as claimed in claim 5,
(2) organosilicon compounds containing Si-bonded hydrogen atoms,
(3) catalysts which promote the addition of Si-bonded hydrogen onto aliphatic multiple bond
and optionally,
(4) agents which retard the addition of Si-bonded hydrogen onto aliphatic multiple bond at room temperature.

12. A process for preparing coatings which repel tacky substances, comprising applying a crosslinkable composition according to claim 7 to a substrate and crosslinking said crosslinkable composition.

13. A process for preparing coatings which repel tacky substances, comprising applying a crosslinkable composition according to claim 8 to a substrate and crosslinking said crosslinkable composition.

14. A process for preparing coatings which repel tacky substances, comprising applying a crosslinkable composition according to claim 9 to a substrate and crosslinking said crosslinkable composition.

15. A process for preparing coatings which repel tacky substances, comprising applying a crosslinkable composition according to claim 10 to a substrate and crosslinking said crosslinkable composition.

16. A process for preparing coatings which repel tacky substances, comprising applying a crosslinkable composition according to claim 11 to a substrate and crosslinking said crosslinkable composition.

* * * * *